US005559169A

United States Patent [19]
Belmont et al.

[11] Patent Number: 5,559,169
[45] Date of Patent: Sep. 24, 1996

[54] EPDM, HNBR AND BUTYL RUBBER COMPOSITIONS CONTAINING CARBON BLACK PRODUCTS

[75] Inventors: James A. Belmont, Acton; Thomas F. Reed, Andover, both of Mass.

[73] Assignee: Cabot Corporation, Boston, Mass.

[21] Appl. No.: 356,459

[22] Filed: Dec. 15, 1994

[51] Int. Cl.$^6$ .............................. C08K 9/04; C08K 5/36; C08L 23/22; C08L 9/00
[52] U.S. Cl. ..................... 523/215; 524/392; 524/565; 524/574; 524/579
[58] Field of Search ........................ 106/473; 523/215; 524/392, 565, 574, 579, 495, 496

[56] References Cited

U.S. PATENT DOCUMENTS

| | | | |
|---|---|---|---|
| T860,001 | 3/1969 | Gessler et al. | 524/574 |
| 2,121,535 | 6/1938 | Amon | 106/473 |
| 2,156,591 | 5/1039 | Jacobson | 502/412 |
| 2,502,254 | 3/1950 | Glassman | 106/476 |
| 2,514,236 | 7/1950 | Glassman | 106/476 |
| 2,625,492 | 1/1953 | Young | 106/482 |
| 2,833,736 | 5/1958 | Glaser | 524/557 |
| 3,011,902 | 12/1961 | Jordan | 106/477 |
| 3,025,259 | 3/1962 | Watson et al. | 523/215 |
| 3,043,708 | 7/1962 | Watson et al. | 106/476 |
| 3,335,020 | 8/1967 | Aboytes et al. | 106/474 |
| 3,479,300 | 11/1969 | Rivin et al. | 106/461 |
| 3,528,840 | 9/1970 | Aboytes | 106/473 |
| 3,607,813 | 9/1971 | Purcell | 524/88 |
| 3,674,670 | 7/1972 | Erikson et al. | 428/411.1 |
| 3,686,111 | 8/1972 | Makhlouf et al. | 524/530 |
| 3,846,141 | 11/1974 | Ostergren et al. | 106/22 H |
| 3,876,603 | 4/1975 | Makhlouf | 523/210 |
| 4,003,751 | 1/1977 | Carder | 106/20 R |
| 4,006,031 | 2/1977 | Ferch et al. | 106/307 |
| 4,014,833 | 3/1977 | Story | 524/377 |
| 4,014,844 | 3/1977 | Vidal et al. | 524/560 |
| 4,061,830 | 12/1977 | Greenberg | 428/469 |
| 4,176,361 | 11/1979 | Kawada et al. | 346/1.1 |
| 4,204,871 | 5/1980 | Johnson et al. | 106/20 |
| 4,204,876 | 5/1980 | Bowden | 106/90 |
| 4,290,072 | 9/1981 | Manuskhani | 346/1.1 |
| 4,293,394 | 10/1981 | Darlington et al. | 204/98 |
| 4,308,061 | 12/1981 | Iwahashi et al. | 106/22 |
| 4,328,041 | 5/1982 | Wilson | 106/429 |
| 4,442,256 | 4/1984 | Miller | 524/539 |
| 4,451,597 | 5/1984 | Victorius | 524/39 |
| 4,476,270 | 10/1984 | Brasen et al. | 524/364 |
| 4,478,905 | 10/1984 | Neely, Jr. | 428/324 |
| 4,503,174 | 3/1985 | Vasta | 523/439 |
| 4,503,175 | 3/1985 | Houze et al. | 524/39 |
| 4,525,521 | 6/1985 | Denhariog | 524/517 |
| 4,525,570 | 6/1985 | Blum et al. | 528/75 |
| 4,530,961 | 7/1985 | Nguyen et al. | 524/832 |
| 4,544,687 | 10/1985 | Schupp et al. | 523/414 |
| 4,555,535 | 11/1985 | Bednarek et al. | 524/40 |
| 4,556,427 | 12/1985 | Lewis | 106/20 |

(List continued on next page.)

FOREIGN PATENT DOCUMENTS

| | | |
|---|---|---|
| 272127 | 6/1988 | European Pat. Off. . |
| 433229 | 6/1991 | European Pat. Off. . |
| 0441987 | 8/1991 | European Pat. Off. . |
| 410152 | 2/1994 | European Pat. Off. . |
| 636591 | 2/1995 | European Pat. Off. . |
| 1164786 | 10/1958 | France . |
| 1224131 | 4/1960 | France . |
| 1215895 | 4/1960 | France . |
| 2477593 | 11/1981 | France . |
| 2564489 | 11/1985 | France . |
| 2607528 | 6/1988 | France . |
| 3170748 | 7/1985 | Germany . |
| 59/82467 | 5/1984 | Japan . |
| 1/275666 | 11/1989 | Japan . |
| 5/271365 | 10/1993 | Japan . |
| 5339516 | 12/1993 | Japan . |
| 6025572 | 2/1994 | Japan . |
| 6/025572 | 2/1994 | Japan . |
| 6073235 | 3/1994 | Japan . |
| 6067421 | 3/1994 | Japan . |
| 862018 | 3/1961 | United Kingdom . |

OTHER PUBLICATIONS

J. B. Donnet et al., "Aroxylic Structure Of The Quinone Groups And Of The Free Radicals Present On Carbon Black Surfaces", Rev. Gen. Caoutchous Plasticques, vol. 42, No. 3, (1965), pp. 389–392. (w/Abstract).
J. B. Donnet et al., "Radical Reactions And Surface Chemistry Of Carbon Black", Bull. Soc. Chim. (1960) (Abstract only).
RAPRA Abstract 432845: Compounding Heat Resistant Non-Black EPDM Rubber, PPG Industries.
RAPRA Abstract 417612, D. C. Edwards, "Review: Polymer–Filler Interactions In Rubber Reinforcement", J. Mat. Sci., vol. 25, No. 10, (1990) pp. 4175–4185.
Gregory, Peter, "Ink Jet Printing", High-Technology Applications of Organic Colorants, Chapter 9, (1991).
RAPRA Abstract 403202, D. Siller, "Organotitanate, Zirconate Effect On Elastomers", Rubb. Plast. News, vol. 19, No. 24, (1990), pp. 14–27.
RAPRA Abstract 390600, H. Okamoto, "Application Of Coupling Agents To Elastomers", Nippon Gomu Kyokaishi, vol. 62, No. 12, (1989) pp. 819–833.
RAPRA Abstract 394030, P. Flink et al., "Mechanical Properties Of Natural Rubber/Grafted Cellulose Fibre Composites", Brit. Polym. J., vol. 22, No. 2, 1990, pp. 147–153.
Tsubokawa et al., "Grafting Onyo Carbon Black Having Few Functional Group" Shikizai Kyokaisha, vol. 66, No. 5, (1993) (Abstract Only).

(List continued on next page.)

*Primary Examiner*—Peter A. Szekely
*Attorney, Agent, or Firm*—Martha Ann Finnegan

[57] ABSTRACT

A rubber composition prepared by the process comprising mixing 100 parts by weight of a rubber selected from EPDM, HNBR, and butyl rubber, and 10 to 300 parts by weight of a carbon black product having an attached organic group. The organic group has the formula —Ar—$S_n$—Ar'— in which Ar and Ar' are arylene groups or —Ar—$S_n$—Ar" in which Ar is an arylene group, Ar" is an aryl group and n is 1 to 8.

12 Claims, No Drawings

U.S. PATENT DOCUMENTS

| | | | |
|---|---|---|---|
| 4,597,794 | 7/1986 | Ohta et al. | 106/20 |
| 4,605,596 | 8/1986 | Fry | 428/423.3 |
| 4,620,993 | 11/1986 | Suss et al. | 427/407.1 |
| 4,620,994 | 11/1986 | Suss et al. | 427/407.1 |
| 4,650,718 | 3/1987 | Simpson et al. | 428/413 |
| 4,659,770 | 4/1987 | Vasta | 524/553 |
| 4,665,128 | 5/1987 | Cluff et al. | 525/131 |
| 4,680,204 | 7/1987 | Das et al. | 427/407.1 |
| 4,681,811 | 7/1987 | Simpson et al. | 428/413 |
| 4,692,481 | 9/1987 | Kelly | 523/219 |
| 4,710,543 | 12/1987 | Chattha et al. | 525/161 |
| 4,713,427 | 12/1987 | Chattha et al. | 525/510 |
| 4,719,132 | 1/1988 | Porter, Jr. | 427/409 |
| 4,727,100 | 2/1988 | Vasta | 524/40 |
| 4,741,780 | 5/1988 | Atkinson | 106/448 |
| 4,752,532 | 6/1988 | Starka | 428/482 |
| 4,764,430 | 8/1988 | Blackburn et al. | 428/413 |
| 4,770,706 | 9/1988 | Pietsch | 106/24 |
| 4,789,400 | 12/1988 | Sclodar et al. | 106/22 |
| 4,798,745 | 1/1989 | Martz et al. | 427/407.1 |
| 4,798,746 | 1/1989 | Claar et al. | 427/407.1 |
| 4,808,656 | 2/1989 | Kania et al. | 524/512 |
| 4,820,751 | 4/1989 | Takeshita et al. | 523/215 |
| 4,840,674 | 6/1989 | Schwarz | 106/22 |
| 4,853,037 | 8/1989 | Johnson et al. | 106/22 |
| 4,883,838 | 11/1989 | Jung et al. | 525/119 |
| 4,908,397 | 3/1990 | Barsotti et al. | 523/400 |
| 4,914,148 | 4/1990 | Hille et al. | 524/507 |
| 4,927,868 | 5/1990 | Schimmel et al. | 523/439 |
| 4,975,474 | 12/1990 | Barsotti et al. | 523/400 |
| 4,994,520 | 2/1991 | Mori et al. | 524/547 |
| 5,008,335 | 4/1991 | Pettit, Jr. | 525/111 |
| 5,017,435 | 5/1991 | Barsotti et al. | 428/502 |
| 5,026,755 | 6/1991 | Kveglis et al. | 524/389 |
| 5,051,464 | 9/1991 | Johnson | 524/555 |
| 5,064,719 | 11/1991 | Den Hartog et al. | 428/411.1 |
| 5,066,733 | 11/1991 | Martz et al. | 524/455 |
| 5,076,843 | 12/1991 | Acitelli et al. | 106/22 |
| 5,093,391 | 3/1992 | Barsotti et al. | 523/400 |
| 5,093,407 | 3/1992 | Komai et al. | 524/495 |
| 5,100,470 | 3/1992 | Hindagolla et al. | 106/22 |
| 5,106,417 | 4/1992 | Hauser et al. | 106/22 |
| 5,109,055 | 4/1992 | Nagasaki et al. | 524/571 |
| 5,114,477 | 5/1992 | Mort et al. | 106/20 |
| 5,122,552 | 6/1992 | Johnson | 523/454 |
| 5,130,004 | 7/1992 | Johnson et al. | 204/181.7 |
| 5,130,363 | 7/1992 | Schall et al. | 524/392 |
| 5,141,556 | 8/1992 | Matrick | 106/20 |
| 5,152,801 | 10/1992 | Altermatt et al. | 8/436 |
| 5,159,009 | 10/1992 | Wolff et al. | 524/495 |
| 5,168,106 | 12/1992 | Babcock et al. | 524/495 |
| 5,173,111 | 12/1992 | Krishnan et al. | 106/20 R |
| 5,179,191 | 1/1993 | Jung et al. | 528/272 |
| 5,182,355 | 1/1993 | Martz et al. | 528/75 |
| 5,184,148 | 2/1993 | Suga et al. | 346/1.1 |
| 5,190,582 | 3/1993 | Shinozuka et al. | 106/20 D |
| 5,200,164 | 4/1993 | Medalia et al. | 106/478 |
| 5,204,404 | 4/1993 | Werner, Jr. et al. | 524/501 |
| 5,206,295 | 4/1993 | Harper et al. | 525/207 |
| 5,221,581 | 6/1993 | Palmer et al. | 428/425 B |
| 5,229,452 | 7/1993 | Green et al. | 524/495 |
| 5,232,974 | 8/1993 | Branan, Jr. et al. | 524/495 |
| 5,236,992 | 8/1993 | Bush | 524/495 |
| 5,242,751 | 9/1993 | Hartman | 428/324 |
| 5,266,361 | 11/1993 | Schwarte et al. | 427/407.1 |
| 5,266,406 | 11/1993 | Den Hartog et al. | 428/423.1 |
| 5,276,097 | 1/1994 | Hoffmann et al. | 525/167 |
| 5,281,261 | 1/1994 | Lin | 106/20 R |
| 5,286,286 | 2/1994 | Winnik et al. | 106/21 A |
| 5,288,788 | 2/1994 | Shieh et al. | 524/495 |
| 5,290,848 | 3/1994 | Palmer et al. | 524/517 |
| 5,302,197 | 4/1994 | Wickramanayke et al. | 106/22 H |
| 5,310,778 | 5/1994 | Shor et al. | 524/556 |
| 5,314,945 | 5/1995 | Nickle et al. | 524/507 |
| 5,314,953 | 5/1994 | Corcoran et al. | 525/123 |
| 5,319,044 | 6/1994 | Jung et al. | 526/279 |
| 5,320,738 | 6/1994 | Kaufman | 205/317 |
| 5,324,790 | 6/1994 | Manring | 525/329.9 |
| 5,334,650 | 8/1994 | Serdiuk et al. | 524/591 |
| 5,336,716 | 8/1994 | Kappes et al. | 525/23 |
| 5,336,753 | 8/1994 | Jung et al. | 528/335 |
| 5,352,289 | 10/1994 | Weaver et al. | 524/496 |
| 5,356,973 | 10/1994 | Taljan et al. | 524/314 |
| 5,366,828 | 11/1994 | Struthers | 429/101 |
| 5,401,313 | 3/1995 | Supplee et al. | 106/429 |

OTHER PUBLICATIONS

R. H. Leach et al., "The Printing Processes", The Printing Ink Manual, Chapter 2, Fourth Edition.

R. H. Leach et al., "Gravure Inks", The Printing Ink Manual, Chapters 8–10, Fifth Edition (1988).

N. Tsubokawa, "Functionalization Of Carbon Black By Surface Grafting Of Polymers", Dept. Of Material and Chemical Eng., pp. 417–470.

"Ink Jet Printing: 1994 Overview and Outlook Supplied", Chapter 7. Andreattola, Ink Jet Ink Technology, pp. 533–534.

Major, Michael J., "Formulating The Future of Automotive Coatings", Modern Paint and Coatings, pp. 34–36, (1992).

Greenfield, David, "Fewer Formulation Options Lead to Emphasis on Familiar", Modern Paint and Coatings, pp. 40–42, (1992).

Schrantz, Joe, "Automotive Coatings", Modern Paint and Coatings pp. 22–31, (1994).

S. Wolff et al., "The Influence of Modified carbon Blacks on Viscoelastic Compound Properties" Kautschuk & Gummi, Kunststoffe 44, Jahrgang, Nr. Oct. 1991, pp. 941–947.

C. Bourdillon, "Immobilization of glucose oxidase on a carbon surface derivatized by electrochemical reduction of diazonium salts" J. Electroanal. Chem., 336 (1992) 113–123.

S. E. Moschopedis et al., "The Reaction of Diazonium Salts with Humic Acids and Coals: Evidence for Activated Methylene Bridges in Coals and Humic Acids" Fuel 43(4) at pp. 289–298 (1964).

Ullmann's Encyclopedia of Industrial Chemistry, vol. A8, pp. 508–509.

J. B. Donnet et al., "Chimie Superficielle Et Sites Privilégiés Des Charges Fines" Conference presentee aux Journees du Caoutehoue, Conference Internationale des Arts Chimiques, 22–23, pp. 5–12, (Jun. 1959).

V. A. Garten et al., "Nature Of Chemisorptive Mechanisms In Rubber Reinforcement", Commonwealth Scientific and Industrial Research Organ., Div. Of Industrial Chem., Melbourne, Australia, pp. 596–609.

J. W. Watson, "Chemical Aspects Of Reinforcement", Compounding Research Dept., Dunlop Research Center, Dunlop Rubber Co., pp. 987–999.

K. Ohkita, et al., "The Reaction Of Carbon Black Surface With 2,2–Diphenyl–1–picrylhydrazyl", CAR, vol. 10, No. 5, (1972) pp. 631–636.

M. L. Studebaker et al., "Oxygen–Containing Groups On The Surface Of Carbon Black", Industrial and Eng. and Chem., vol. 48, No. 1, pp. 162–166.

T. Yamaguchi et al., "Novel Carbon Black/Rubber Coupling Agent", Kautschuk and Gummi, Kunststoffe 42, Jahrgang Nr. May 1989, pp. 403–409.

"Regulations Focus Formulator Attention on Additives", Modern Paint and Coatings, pp. 32–36, (1994).

Sherrer, Robert, "Coloration Of Ink Jet Inks", BLS Ink Jet Printing Conference, Oct. 10–12, (1994), Monterey CA.

Allen, Ross, "Thermal Ink Jet Printing Trends and Advances", BLS Ink Jet Printing Conference, Oct. 10–12, (1994), Monterey, CA.

Schneider, John, "Continuous Ink Jet", BLS Ink Jet Printing Conference Oct. 10–12 (1994) Monterey, CA.

Abstract 388935, R. Mushack, "Light–Colored Fillers In Polymers", Gummi Fas. Kinst., vol. 42, No. 11, (1989), pp. 584–592.

Abstract 301034, J. Y. Germain et al., "Carbon Black Is Better With Silica" Rubb. World, vol. 193, No. 1, (1985), pp. 51–54.

Abstract 343229, "White And Black fillers For Rubber Compounds", Ind.d. Gomma, vol. 30, No. 12, (1986) pp. 23–54.

Abstract 177481, L. Corbelli, "Ethylene–Proplene Rubbers", London Applied Science Publishers Ltd., (1981) Chapter 4, pp. 87–129.

Abstract 105623, G. Sugerman et al., "Putting Performance Into Thermosets With Titanium Coupling Agents", Cleveland, Ohio, (1976), pp. 106–113.

Abstract 056893, M. W. Ranney et al., "Applicaitons For Silane Coupling Agents In The Automotive Industry", Kaut. U. Gummi Kunst., vol. 28, No. 10, (1975), pp. 597–608.

Abstract 002608, H. E. Haxo et al., "Ground Rice Hull Ash As A Filler For Rubber", Philadelphia, Paper No. 8, (1974), pp. 41, Preprint .012.

Abstract 000937, G. M. Cameron et al., "Reduction Of Hear Build–Up In Mineral–Filler Elastomers Through The Use Of Silane Coupling Agents", Gothenburg, (44) (1973) Ser. Sec. 012.

Abstract 86056110, "Putting Performance Into Thermosets With Titanium Coupling Agents", G. Sugerman et al., High Performance Plast. National Tech. Conference, Soc. Plast. Eng.

EPDM, HNBR AND BUTYL RUBBER COMPOSITIONS CONTAINING CARBON BLACK PRODUCTS

BACKGROUND OF THE INVENTION

1. Field of the Invention

The present invention relates to the use of carbon black products in EPDM, HNBR, and butyl rubber compositions to provide increased modulus and increased bound rubber as well as other valuable properties.

2. Discussion of Related Art

EPDM, HNBR, and butyl rubber are well known rubber compositons used in a wide variety of industrial and consumer products. See McGraw-Hill Encyclopedia of Science & Technology, pp. 761–763 (McGraw-Hill, 1982). EPDM is a copolymer of ethylene-propylene-diene monomers. HNBR is a partially hydrogenated copolymer made from the copolymerization of acrylonitrile and butadiene. Butyl rubber is a copolymer of isobutylene and isoprene.

EPDM, HNBR, and butyl rubber compositions are used in a wide variety of products. These products include, for example, automotive parts, gaskets, cable and wire coatings, mechanical rubber products, cover strips for the sidewalls of tires, innertubes for tires, safety bumpers, fabric coatings, electrical wire insulation, hoses, mechanical rubber goods, and sealants for ponds or reservoirs.

One characteristic of EPDM, HNBR, and butyl rubber is their low levels of unsaturation. The low level of unsaturation in EPDM, HNBR, and butyl rubber limits the effectiveness of reinforcing agents in rubber compositions made from these rubbers. This is particularly true when compared with the use of reinforcing agents in diene rubbers which have high degrees of unsaturation. Butyl rubber, for example, is generally a polybutylene with 0.5–4.5% of a diolefin, normally 3% isoprene. The small amount of diolefin in butyl rubber provides unsaturation for reinforcement and crosslinking.

Carbon blacks have been utilized as pigments, fillers, and/or reinforcing agents in the compounding and preparation of rubber compositions. The properties of the carbon black are important factors in determining various performance properties of the rubber composition containing the carbon black. See, for example, U.S. Pat. No. 5,236,992, which is incorporated herein by reference.

It would be desirable to develop a carbon black product which would impart desirable properties to EPDM, HNBR, and butyl rubber compositions containing the carbon black product.

SUMMARY OF THE INVENTION

Accordingly, the present invention provides new rubber compositions prepared by the process comprising mixing 100 parts by weight of a rubber selected from EPDM, HNBR, and butyl rubber, and 10 to 300 parts by weight of a carbon black product having an attached organic group of the formula —Ar—$(S)_n$—Ar'— in which Ar and Ar' are arylene groups and n is 1 to 8, preferably 2 to 4.

In another embodiment, the invention provides a rubber composition prepared by the process comprising mixing 100 parts by weight of a rubber selected from EPDM, HNBR, butyl rubber, and 10 to 300 parts by weight of a carbon black product having an attached organic group of the formula —Ar—$(S)_n$—Ar" in which Ar is an arylene group, Ar" is an aryl group and n is 1 to 8, preferably 2 to 4.

The rubber compositions of the invention show increased modulus and increased bound rubber compared to that of the corresponding carbon blacks without the attached organic groups. Other features of the present invention will become apparent from the following detailed description of the invention and the claims.

DETAILED DESCRIPTION OF THE INVENTION

The present invention relates to a rubber composition prepared by the process comprising mixing 100 parts by weight of a rubber selected from EPDM, HNBR, and butyl rubber, and 10 to 300 parts by weight of a carbon black product having an attached organic group. The organic groups have the general formula —Ar—$(S)_n$—Ar'— in which Ar and Ar' are arylene groups or the general formula —Ar—$(S)_n$—Ar" in which Ar is an arylene group and Ar" is an aryl group. In each of the general formulas the integer n varies from 1 to 8, preferably 2 to 4.

The carbon black product is prepared by reacting a carbon black with a diazonium salt corresponding to the organic group in a liquid reaction medium to attach at least one organic group to the surface of the carbon black. According to the invention, a diazonium salt is an organic compound having one or more diazonium groups. The diazonium salt can be conveniently prepared using means known in the art from a primary amine corresponding to the organic group, for example, $H_2N$-Ar-$(S)_n$-Ar'-$NH_2$ or $H_2N$-Ar-$(S)_n$-Ar". Preferred reaction media include water, any medium containing water, and any medium containing alcohol. These carbon black products and various methods for their preparation are described in a U.S. patent application entitled "Reaction of Carbon Black with Diazonium Salts, Resultant Carbon Black Products and Their Uses," filed Dec. 15, 1994 and incorporated herein by reference. Preparation of such carbon black products are also shown in the Examples below.

These carbon black products having organic groups of the formula —Ar—$(S)_n$—Ar'— or —Ar—$(S)_n$—Ar" are particularly useful in EPDM, HNBR, and butyl rubber compositions. In these organic groups Ar and Ar' are independently arylene groups, Ar" is an aryl and n is 1 to 8. Preferred arylene groups include phenylene groups, particularly p-phenylene groups. Preferred aryl groups include phenyl and naphthyl. The number of sulfurs present defined by n preferably ranges from 2 to 4. A particularly preferred organic group is bis-para-$(C_6H_4)$—$S_2$—$(C_6H_4)$—.

The above carbon black products may be mixed with EPDM, HNBR, or butyl rubbers by normal means known in the art, for example by milling. The rubber compositions containing the carbon black products can be cured using conventional sulfur-based or peroxide systems. Other conventionally used additives may be added to the rubber compositions of this invention.

Generally, amounts of the carbon black product ranging from about 10 to about 300 parts by weight can be used for each 100 parts by weight of the rubber in order to impart a significant degree of reinforcement. It is, however, preferred to use amounts varying from about 50 to about 200 parts by weight of carbon black product per 100 parts by weight of the rubber and especially preferred is the utilization of from about 70 to about 150 parts of carbon black product per 100 parts of the rubber.

The presence of the carbon black products discussed above improves the physical characteristics of the rubber compositions of the invention as compared with the corresponding untreated carbon blacks. Incorporating the carbon black products into the rubber compositions increases the modulus and bound rubber properties of the rubber compositions.

The following examples are intended to illustrate, not limit, this invention.

ASTM test procedures were used to evaluate the rubber compositions of the invention shown in the Examples below. Iodine number was measured using ASTM D-1510. DBPA was measured using ASTM D-2414. Tensile elongation and modulus were measured using ASTM D-412. Shore A hardness was measured using ASTM D-2240-86. Viscosity was measured using a MPT viscometer at 100° C. and 100s$^{-1}$ with L/D=16/1 in the capillary.

Tan δ was measured with a Rheometrics Dynamic Spectrometer Model RDS-2 at a constant frequency of 10 Hz, at room temperature, and in the shear mode of strain. Strain sweeps were run from 0.08% to 10% DSA. Measurements were taken at five points per decade and the maximum Tan δ was reported.

Bound rubber was determined as follows: A 0.5 g sample of an uncured rubber composition containing a rubber and a known amount of a carbon black was placed in a wire cage and submerged in a solvent. After standing for one day, the sample was placed in fresh solvent, and allowed to stand for three additional days at room temperature. The sample was then removed, dried in an oven, and weighed. The weight of the carbon black was subtracted from weight of the sample before and after the solvent treatment to give a value for the amount of rubber in each sample. The weight of the sample after the solvent treatment, adjusted for the weight of the carbon black and other insoluble ingredients in the composition, represents the amount of insoluble rubber remaining. Bound rubber was expressed as the percentage of the weight of insoluble rubber in the sample after standing in the solvent versus the amount of rubber in the original sample.

EXAMPLE 1

Preparation of a carbon black product

This example describes the preparation of a carbon black product for use in the present invention. Concentrated HCl (2.62 g) was diluted with 30 g and added to a stirring mixture of 1.5 g p-aminophenyl disulfide in 100 g of water. The resulting solution was cooled in an ice bath and a cold solution of 0.95 g NaNO$_2$ in 40 g of water was added with stirring. 4-Diazophenyl disulfide is formed. The solution was added to a suspension of 150 g of pelleted carbon black (iodine number of 19 mg/g and a DBPA of 95 ml/100g) in 1200 mL of water at about 14° C. with stirring. Bubbles were released. After stirring for 2¼ hours, the product was filtered, washed with 800 mL of ethanol, washed with 2L of water, and dried at 125° C. This process produced a carbon black product having dithiodi(4,1-phenylene) groups attached to the carbon black.

EXAMPLE 2

Reference carbon black

A reference carbon black was prepared by washing 158 g of the unreacted carbon black of Example 1 with 800 mL of ethanol, about 2 L of water, and subsequently drying in an oven at 125° C.

EXAMPLE 3

Preparation of a carbon black product

This example describes the preparation of a carbon black product for use in the present invention. Concentrated HCl (5.70 g) was diluted with 30 g of water and added to a stirring mixture of 3.50 g p-aminophenyl disulfide in 100 g of water. The resulting solution was cooled in an ice bath and a cold solution of 2.11 g NANO2 in 50 g of water was added with stirring. 4-Diazophenyl disulfide is formed. The solution was added to a suspension of 250g of pelleted carbon black (iodine number of 36 mg/g and a DBPA of 122 ml/100g) in 1500 mL of water at about 14° C. with stirring. Bubbles were released. After stirring for 2 hours, the product was filtered, washed with 1.1 L of ethanol, washed with 3 L of water, and dried at 125° C. A sample of the carbon black product that was extracted overnight with tetrahydrofuran (THF) and dried contained 1.32% sulfur, compared to 0.99% for the unreacted carbon black. Therefore, the product contained 0.05 mmol/g of dithiodi(4,1-phenylene) groups.

EXAMPLE 4

Reference carbon black

A reference carbon black was prepared by washing 250 g of the unreacted carbon black of Example 3 with 1.1 L of ethanol, about 3 L of water, and subsequently drying in an oven at 125° C.

EXAMPLE 5

Use of a carbon black product in EPDM

This example illustrates the use of the carbon black product of Example 1, the washed carbon black reference of Example 2 and the unwashed carbon black reference from Example 1 in EPDM. VISTALON 5600 EPDM (81.4 g) (VISTALON is a registered trademark of Exxon Chemical Americas, Houston, Tex.) was milled in a Brabender mixer for one minute at an initial temperature of 45° C. at 77 rpm. A paraffinic oil ASTM D-2226, type 104B, (122.1 g) was added and mixed for one minute. The carbon black (122.1 g) was added and mixed for 2½ minutes. Zinc oxide (4.07 g) and 0.81 g of stearic acid were added and mixed for two minutes. Tetramethyl thiuram disulfide (2.2 g), 2.2 g of zinc dibutyldithiocarbamate, 2.2 g of zinc dimethyldithiocarbamate, 0.41 g of sulfur and 1.38 g of 4,4'dithiodimorpholine were added and mixed for an additional two minutes. Bound rubber was determined using toluene as the solvent at room temperature. The table below shows that the carbon black product of Example 1 is useful in EPDM and increases modulus and bound rubber.

| Sample | Tensile MPa | Elongation % | Modulus 100% MPa | Modulus 300% MPa | Hardness Sh A | Viscosity Pa-s | Bound Rubber % |
|---|---|---|---|---|---|---|---|
| Ex. 1 | 10.9 | 553 | 1.62 | 5.96 | 47 | 2120 | 8.8 |
| Ref. Ex. 2 | 12.4 | 731 | 1.26 | 3.75 | 46 | 2130 | 5.8 |
| Ref. Unwashed | 11.9 | 679 | 1.38 | 4.16 | 46 | 2080 | 7.1 |

EXAMPLE 6

Use of a carbon black product in EPDM

This example illustrates the use of the carbon black product of Example 3, the washed carbon black reference of Example 4 and the unwashed carbon black reference from Example 3 in EPDM. VISTALON 5600 EPDM (81.4 g) was milled in a Brabender mixer for one minute at an initial temperature of 60° C. at 50 rpm. A paraffinic oil ASTM D-2226, type 104B, (122.1 g) was added and mixed for one minute. The carbon black (122.1 g) was added and mixed for 2½ minutes. Zinc oxide (4.07 g) and 0.81 g of stearic acid were added and mixed for two minutes. Tetramethyl thiuram disulfide (2.2 g), 2.2 g of zinc dibutyldithiocarbamate, 2.2 g of zinc dimethyldithiocarbamate, 0.41 g of sulfur and 1.38 g of 4,4'dithiodimorpholine were added and mixed for an additional two minutes. Bound rubber was determined using toluene as solvent at room temperature. The table below shows that the carbon black product of Example 3 is useful in EPDM and increases modulus and bound rubber.

type 104B, (21.7 g) and the carbon black (135.9 g) were added and mixed for two minutes. ZnO (9.1 g) and sulfur (2.7 g) were added and milling was continued for 3½ minutes. Tetramethyl thiuram disulfide (3.6 g) and mercaptobenzothiazole (1.8 g) were added and mixed for an additional 1½ minutes. Bound rubber was determined using cyclohexane as solvent at room temperature. The table below shows that the carbon black product of Example 3 is useful in butyl rubber, increases modulus and bound rubber, and decreases hysteresis as shown by higher rebound and lower Tan δ.

| Sample | Tensile MPa | Elongation % | Modulus 100% MPa | Modulus 300% MPa | Hardness Sh A | Viscosity Pa-s | Bound Rubber % |
|---|---|---|---|---|---|---|---|
| Ex. 3 | 10.0 | 364 | 2.93 | 8.61 | 63 | 2260 | 44.8 |
| Ref. Ex. 4 | 10.6 | 467 | 2.63 | 7.14 | 62 | 2230 | 39.6 |
| Ref. Unwashed | 9.8 | 441 | 2.63 | 7.13 | 62 | 2150 | 39.8 |

EXAMPLE 7

Use of a carbon black product in butyl rubber

This example illustrates the use of the carbon black product of Example 3, the washed carbon black reference of Example 4 and the unwashed carbon black reference from

| Sample | Tensile MPa | Elongation % | Modulus 100% MPa | Modulus 300% MPa | Hardness Sh A | Rebound % | Tan δ | Viscosity Pa-s | Bound Rubber % |
|---|---|---|---|---|---|---|---|---|---|
| Ex. 3 | 11.7 | 470 | 3.49 | 9.43 | 74 | 13.2 | 0.29 | 5020 | 7.54 |
| Ref. Ex. 4 | 10.6 | 528 | 2.97 | 7.58 | 70 | 12.2 | 0.35 | 4880 | 3.54 |
| Ref. Unwashed | 10.2 | 520 | 2.94 | 7.51 | 71 | 12.1 | 0.37 | 4850 | 4.42 |

Example 3 in butyl rubber. Butyl rubber 301 (181.1g) was milled in a Brabender mixer at 40 rpm for 30 seconds at an initial temperature of 30° C. A paraffinic oil ASTM D-2226,

EXAMPLE 8

Preparation of a carbon black product

This example illustrates the preparation of a carbon black product useful in the rubber compositions of the present invention. A carbon black with an iodine number of 120 mg/g and a DBPA of 125 ml/100 g was used. A cold solution of 2.65 g concentrated HCl and 30 g water was added to a mixture of 2.85 g 4-aminophenyl phenyl disulfide in 50 g water that was stirring in an ice bath. A cold solution of 1.04 g $NaNO_2$ in 30 g of water was added over a period of 10 minutes. 4-Diazophenyl phenyl disulfide chloride was formed. The diazonium suspension was added to a suspension of 122 g carbon black in about 800 g water that was stirring at 15° C. Bubbles were released. After stirring for about two hours, the carbon black product was filtered off, washed with isopropanol, washed with water, and dried in an oven at about 125° C. A sample of the carbon black product that had been subjected to Soxhlet extraction overnight with THF and dried had a sulfur content of 1.32%, compared to 1.08% for the untreated carbon black. Therefore, the carbon black product had 0.038 mmol/g of attached phenyldithiophenylene groups. This carbon black product may be incorporated into a rubber composition of the invention in accordance the examples above.

EXAMPLE 9

Use of a carbon black product in HNBR

Following generally the procedures of Examples 5–7, a carbon black product such as shown in Examples 1–4 and 8 may be incorporated into HNBR to form a rubber composition of the invention.

The claimed invention is:

1. A rubber composition prepared by the process comprising mixing rubber selected from the group consisting of a copolymer of ethylene-propylene-diene monomers (EPDM), a partially hydrogenated copolymer of acrylonitrile and butadiene (HNBR), and a butyl rubber, and 10 to 300 parts by weight of a carbon black product per 100 parts by weight of the rubber, wherein the carbon black product has an attached organic group of the formula —Ar—$(S)_n$—Ar'— in which Ar and Ar' are arylene groups and n is 1 to 8.

2. A rubber composition of claim 1 wherein n is 2 to 4.

3. A rubber composition of claim 1 wherein the process further comprises curing the mixture of the rubber and the carbon black product.

4. A rubber composition of claim 1 wherein Ar and Ar' are p-phenylene and n is 2 to 4.

5. A rubber composition of claim 4 wherein n is 2.

6. A rubber composition of claim 1 wherein the rubber is a copolymer of ethylene-propylene-diene monomers (EPDM).

7. A rubber composition prepared by the process comprising mixing rubber selected from the group consisting of a copolymer of ethylene-propylene-diene monomers (EPDM), a partially hydrogenated copolymer of acrylonitrile and butadiene (HNBR), and a butyl rubber, and 10 to 300 parts by weight of a carbon black product per 100 parts by weight of the rubber, wherein the carbon black product has an attached organic group of the formula —Ar—$(S)_n$—Ar"— in which Ar is an arylene group, Ar" is an aryl group and n is 1 to 8.

8. A rubber composition of claim 7 wherein n is 2 to 4.

9. A rubber composition of claim 7 wherein the process further comprises curing the mixture of the rubber and the carbon black product.

10. A rubber composition of claim 7 wherein Ar is phenylene, Ar' is phenyl and n is 2 to 4.

11. A rubber composition of claim 10 wherein n is 2.

12. A rubber composition of claim 7 wherein the rubber is a copolymer of ethylene-propylene-diene monomers (EPDM).

* * * * *

UNITED STATES PATENT AND TRADEMARK OFFICE
CERTIFICATE OF CORRECTION

PATENT NO. : 5,559,169
DATED : September 24, 1996
INVENTOR(S) : James A. Belmont et al.

It is certified that error appears in the above-indentified patent and that said Letters Patent is hereby corrected as shown below:

On the title page, item: [56] References Cited;" "FOREIGN PATENT DOCUMENTS" add the following:

--92/13983   8/1992   PCT--

On page 1, at the end of the section entitled "[56] References Cited;" "OTHER PUBLICATIONS" add the following:

--Journal of American Chemical Society, 1992, 114, 5883-5884--

Signed and Sealed this

Twenty-second Day of April, 1997

Attest:

BRUCE LEHMAN

Attesting Officer

Commissioner of Patents and Trademarks